(12) United States Patent
Sethuraman et al.

(10) Patent No.: US 6,652,825 B2
(45) Date of Patent: Nov. 25, 2003

(54) METHOD OF PRODUCING CALCIUM SULFATE ALPHA-HEMIHYDRATE

(75) Inventors: Gopalakrishnan Sethuraman, East Amherst, NY (US); Claudette Brown, Lackawanna, NY (US); Ronald S. Finkelstein, East Amherst, NY (US)

(73) Assignee: National Gypsum Properties LLC, Charlotte, NC (US)

( * ) Notice: Subject to any disclaimer, the term of this patent is extended or adjusted under 35 U.S.C. 154(b) by 112 days.

(21) Appl. No.: 09/846,728

(22) Filed: May 1, 2001

(65) Prior Publication Data

US 2002/0164281 A1 Nov. 7, 2002

(51) Int. Cl.⁷ .............................................. C01B 17/96
(52) U.S. Cl. ............. 423/555; 204/157.15; 204/157.43; 204/157.49; 204/157.5
(58) Field of Search ...................... 423/555; 204/157.15, 204/157.43, 157.49, 157.5

(56) References Cited

U.S. PATENT DOCUMENTS

| | | | |
|---|---|---|---|
| 2,616,789 A | 11/1952 | Hoggatt | 23/122 |
| 2,907,668 A | 10/1959 | Nies et al. | 106/111 |
| 3,337,298 A | 8/1967 | Ruter et al. | 23/122 |
| 3,901,778 A * | 8/1975 | Machi et al. | 204/157.1 H |
| 4,091,080 A | 5/1978 | Kosugi et al. | 423/555 |
| 4,842,842 A | 6/1989 | Kudo | 423/554 |
| 5,015,450 A | 5/1991 | Koslowski | 423/172 |
| 5,093,093 A * | 3/1992 | Koslowski | 423/171 |
| 5,248,487 A * | 9/1993 | Bold et al. | 473/171 |
| 5,562,892 A * | 10/1996 | Kirk et al. | 423/555 |

FOREIGN PATENT DOCUMENTS

| | | | | |
|---|---|---|---|---|
| DE | 3631883 A1 | 3/1998 | | C04B/11/02 |
| EP | 0244 722 A2 | 11/1987 | | C04B/11/02 |
| GB | 2198720 A * | 6/1988 | | |
| KR | 98049275 A * | 9/1998 | | C01F/11/46 |
| RU | 2023699 | 11/1994 | | C04B/11/02 |
| SU | 1502513 A1 | 8/1989 | | C04B/11/02 |
| SU | 1608121 | 11/1990 | | C04B/11/024 |

OTHER PUBLICATIONS

Derwent English Abstract of DE 36 31 883 A, Mar. 31, 1988.*
PCT Written Opinion dated Apr. 23, 2003.
Response to PCT Written Opinion dated Jul. 9, 2003.
Koo–Jong Lee and Sang–Heul Choi, "*Effect of Salts on the Formation of a–Calcium Sulfate Hemihydrate from by–Product Gypsum of Phosphoric Acid Process under Water Vapor at Atmospheric Pressure*," Journal of Korean Ceramic Society, vol. 25 No. 3(86), pp. 300–306 (1988).

Kostic Pulek et al., "*Developing and Hydrothermal Technique for Production for Alpha–Hemihydrate Calcium–Sulphate from Flue Gas Gypsum*," Institute of Chemical Technology, Prague, Ceramics—Silikaty, vol. 40 No. 3, pp. 99–102 (1996).
Lindroth et al., "*Microwave drying of flue gas desulfurized (by product) gypsum*," Intl. J. Surface Mining, Reclamation and Environ. vol. 9, pp. 169–177 (1995).
Danica H. Turk et al., "*The Effect of Sorbed Water on the Determination of Phase Composition of $CaSO_4H_2O$ Systems by Various Methods*," The Chemistry and Technology of Gypsum, ASTM STP 861, R.A. Kuntze, Ed., American Society for Testing and Materials, pp. 48–56 (1984).
Evans et al., "*A study of the Dielectric Properties of Gypsum and their Relation to Microwave Drying Behaviour*," Proceedings of Microwave and High Frequency Heating Conference, St. Johns College, Cambridge, 4 pages (1995).
Zurz et al., "*Autoclave–Free Formation of a–Hemihydrate Gypsum*," Journal of the American Ceramic Society, vol. 74, No. 5, pp. 1117–1124 (1991).
Database WPI; Week 199941 Derwent Publications Ltd., London, GB; AN 1999–491912; XP002209860 for KR 98 049 275 A (Pohang Ind Sci Res Inst) Abstract 1999 (No month).
Database WPI; Week 199527 Derwent Publications Ltd., London, GB; AN 1995–205038; XP002209862 for RU 2 023 699 A (Urals Constr Materials Res Des Inst) Abstract 1995 (No month).
Database WPI; Week 199131 Derwent Publications Ltd., London, GB; AN 1991–228779 XP002209863 for SU 1 608 121 A (As UKR Geology Geoc) Abstract 1991 (No month).
Database WPI; Week 199022 Derwent Publications Ltd., London, GB; AN 1990–169617 XP002209861 for SU 1 502 513 A (Minsk Gypsum Cons) Abstract 1999 (No month).
PCT International Search Report dated Aug. 14, 2002.

* cited by examiner

Primary Examiner—Stanley S. Silverman
Assistant Examiner—Timothy C Vanoy
(74) Attorney, Agent, or Firm—Howrey Simon Arnold and White, LLP

(57) ABSTRACT

A method of producing calcium sulfate α-hemihydrate is disclosed, including the steps of exposing a mixture including a calcium sulfate form selected from the group consisting of calcium sulfate dihydrate, calcium sulfate β-hemihydrate, water-soluble calcium sulfate anhydrite, and mixtures thereof, water, and a crystallization catalyst, to microwave radiation to produce calcium sulfate α-hemihydrate; and separating at least a portion of the calcium sulfate α-hemihydrate to provide a solid comprising calcium sulfate α-hemihydrate and a filtrate and/or remainder that can be recycled to provide at least one of a calcium sulfate form, water, a crystallization catalyst, a crystal habit modifier, and a surfactant for use in production of additional α-hemihydrate.

28 Claims, 8 Drawing Sheets

METHOD OF PRODUCING CALCIUM SULFATE ALPHA-HEMIHYDRATE

BACKGROUND OF THE INVENTION

1. Field of the Invention

The invention generally relates to a method for the production of calcium sulfate alpha-hemihydrate and, more particularly, to the conversion of other non-hydrated or partially- to fully-hydrated forms of calcium sulfate to calcium sulfate alpha-hemihydrate.

2. Brief Description of Related Technology

Calcium sulfate hemihydrate, commonly referred to as "calcined gypsum," "stucco," or "plaster of Paris," is used in many applications, such as producing molded articles and wallboard for the construction industry. Calcium sulfate hemihydrate has a number of desirable physical properties including, but not limited to, its fire resistance, thermal and hydrometric dimensional stability, compressive strength, and neutral pH.

Typically, calcium sulfate hemihydrate is prepared by drying, grinding, and calcining natural gypsum rock (i.e., calcium sulfate dihydrate). Gypsum as a raw material is also a byproduct in the production of phosphoric, boric, and some organic acids, resulting from the reaction between their calcium salts and sulphuric acid, and is a secondary material in processing some minerals, production of pigments, and in desulfurization of flue gases from burning fossil fuels. The drying step of calcium sulfate hemihydrate manufacture includes passing crude gypsum rock through a rotary kiln to remove any free moisture present in the rock from rain or snow, for example. The dried rock then is passed through a roller mill (or impact mill types of pulverizers), wherein the rock is ground or comminuted to a desired fineness. The degree of comminution is determined by the ultimate use. The dried, fine-ground gypsum can be referred to as "land plaster" regardless of its intended use. The land plaster is used as feed to calcination processes for conversion to stucco. Land plaster typically has a degree of impurities such as clay and strontium sulfate, from about 5% by weight to about 20% by weight. Small amounts of calcium sulfate β-hemihydrate and/or calcium sulfate anhydrite can also be present in land plaster.

The calcination (or dehydration) step in the manufacture of calcium sulfate hemihydrate is performed by heating the land plaster, and generally can be described by the following chemical equation which shows that heating calcium sulfate dihydrate yields calcium sulfate hemihydrate (stucco) and water vapor:

$$CaSO_4 \cdot 2H_2O + heat \rightarrow CaSO_4 \cdot \tfrac{1}{2}H_2O + 1\tfrac{1}{2}H_2O.$$

This calcination process step is performed in a "calciner," of which there are several types known by those of skill in the art.

Upon further loss of water, calcium sulfate anhydrite is produced according to the following chemical equation:

$$CaSO_4 \cdot \tfrac{1}{2}H_2O + heat \rightarrow CaSO_4 + \tfrac{1}{2}H_2O.$$

The presence of calcium sulfate anhydrite is generally not desired in a calcium sulfate α-hemihydrate product.

Uncalcined calcium sulfate (i.e., land plaster) is the "stable" form of gypsum. However, calcined gypsum, or stucco, has the desirable property of being chemically reactive with water, and will "set" rather quickly when mixed with water. This setting reaction is actually a reversal of the above-described chemical reaction performed during the calcination step. The setting reaction proceeds according to the following chemical equation which shows that the calcium sulfate hemihydrate is rehydrated to its dihydrate state:

$$CaSO_4 \cdot \tfrac{1}{2}H_2O + 1\tfrac{1}{2}H_2O \rightarrow CaSO_4 \cdot 2H_2O + heat.$$

The water requirement for addition to the stucco is enough to provide 1½ moles of water per mole of calcium sulfate for the rehydration reaction plus sufficient water to create a slurry of workable consistency. The actual time required to complete the setting reaction generally depends upon the type or form of hemihydrate, the type of calciner, and the type of gypsum rock that are used to produce the gypsum, and can be controlled within certain limits by the use of additives such as retarders, set accelerators, and/or stabilizers, for example.

Calcium sulfate hemihydrate occurs in two forms, alpha type (referred to herein as calcium sulfate alpha-hemihydrate, calcium sulfate α-hemihydrate, or simply α-hemihydrate) and beta type (referred to herein as calcium sulfate beta-hemihydrate, calcium sulfate β-hemihydrate, or β-hemihydrate). Calcium sulfate α-hemihydrate is generally characterized by needle-shaped crystals which have a lower water requirement, set faster (i.e., produce calcium sulfate dihydrate faster), and produce articles of higher strength. The formation of calcium sulfate α-hemihydrate from calcium sulfate dihydrate can be confirmed by scanning electron micrographs (SEM), differential scanning calorimetry (DSC) and various other methods.

Various methods are known for producing calcium sulfate α-hemihydrate of varying quality from calcium sulfate dihydrate. Calcium sulfate β-hemihydrate can also be converted to calcium sulfate α-hemihydrate by first forming calcium sulfate dihydrate.

One process of forming calcium sulfate α-hemihydrate involves placing calcium sulfate dihydrate in an autoclave in the presence of saturated steam at elevated pressure over an extended period of time (e.g., one to three hours). See, e.g., U.S. Pat. No. 5,015,450 (May 14, 1991), the disclosure of which is hereby incorporated herein by reference. In another process, gypsum is added to an aqueous solution including a crystallization accelerator and heated over an extended period of time under increased pressure while keeping the slurry in an agitated state. See, e.g., U.S. Pat. No. 4,842,842 (Jun. 27, 1989) and U.S. Pat. No. 4,091,080 (May 23, 1978), the disclosures of which are hereby incorporated herein by reference.

In still another process, gypsum is suspended in an aqueous solution, at atmospheric pressure, containing a soluble inorganic salt such as magnesium sulfate, sodium chloride, or calcium chloride, an inorganic acid such as sulfuric acid, nitric acid, or phosphoric acid, or an alkali metal salt of an organic acid, and heated at a temperature between about 80° C. and the boiling point of the solution. See, e.g., U.S. Pat. No. 4,091,080, Kostic-Pulek et al., "Developing a Hydrothermal Technique for Production of Alpha-Hemihydrate Calcium-Sulphate from Flue Gas Gypsum," Ceramics—Silikaty 40 (3) 99–102 (1996), and Z̆urz̆ et al., "Autoclave-Free Formation of α-Hemihydrate Gypsum," J. Am. Ceram. Soc.74(5) 1117–24 (1991).

All of these methods are typically batch operations wherein the resultant product is filtered from the solution, washed with hot water to remove the inorganic salt, acid, or other catalyst from the surface of the crystals, and then heated to dry surface moisture from the crystals. Alternatively, the filtered solid has been washed with anhydrous solvents such as ethanol and/or acetone to both dry the crystals and remove residual catalysts. The time-limiting step in the process typically is the step of forming calcium sulfate α-hemihydrate.

The use of microwave energy to dry surface moisture from calcium sulfate α-hemihydrate has been reported by Zürz et al., "Autoclave-Free Formation of α-Hemihydrate Gypsum," J. Am. Ceram. Soc. 74(5) 1117–24 (1991). Unlike conventional heating, microwave heating is more efficient because the radiation is absorbed directly by water molecules and dissipated as heat through vibration of the water molecules. In addition, microwave heating can often more quickly and uniformly raise the temperature of a given sample of matter because the radiation penetrates through non-absorbing matter, and heating absorbing matter from the inside.

The use of microwave energy to dry surface moisture from gypsum (calcium sulfate dihydrate) has also been reported. See, e.g., Lindroth et al., "Microwave drying of flue gas desulfurized (by-product) gypsum," Intl. J. Surface Mining, Reclamation and Environ. 9 169–77 (1995) and Turk et al., "The Effect of Sorbed Water on the Determination of Phase Composition of $CaSO_4.H_2O$ Systems by Various Methods," The Chemistry and Technology of Gypsum, ASTM STP 861, R. A. Kuntze, Ed., 48–56 (1984). Evans et al. in "A Study of the Dielectric Properties of Gypsum and their Relation to Microwave Drying Behaviour," Proceedings of Microwave and High Frequency Heating Conference, St Johns College, Cambridge (1995), reported that the use of microwave energy to remove free moisture is feasible, but that if sufficient energy is supplied to the product and temperatures of about 120+ C. are obtained, the conversion to hemihydrate will initiate, and a runaway reaction forming the anhydrite will occur.

Accordingly, it would be desirable to provide a method for rapidly and efficiently producing calcium sulfate α-hemihydrate from forms of calcium sulfate without formation of substantial calcium sulfate anhydrite.

SUMMARY OF THE INVENTION

It is an objective of the invention to overcome one or more of the problems described above.

Accordingly, one aspect of the invention is a method of producing calcium sulfate α-hemihydrate including the steps of exposing a mixture including a calcium sulfate form selected from the group consisting of calcium sulfate dihydrate, calcium sulfate β-hemihydrate, soluble calcium sulfate anhydrite, and mixtures thereof, water, and a crystallization catalyst, to microwave radiation to produce calcium sulfate α-hemihydrate, and separating at least a portion of the calcium sulfate α-hemihydrate to provide a solid including calcium sulfate α-hemihydrate, and a remainder.

Another aspect of the invention is a method of producing calcium sulfate α-hemihydrate, including the steps of exposing a mixture including a calcium sulfate form selected from the group consisting of calcium sulfate dihydrate, calcium sulfate β-hemihydrate, soluble calcium sulfate anhydrite, and mixtures thereof, water, and a crystallization catalyst, to microwave radiation to produce calcium sulfate α-hemihydrate, and isolating calcium sulfate α-hemihydrate.

Still another aspect of the invention is a method of producing calcium sulfate α-hemihydrate including the steps of forming a mixture including calcium sulfate dihydrate, water, and calcium chloride, wherein the calcium chloride is present at a concentration of at least about 2 molar, exposing the mixture to microwave radiation to produce calcium sulfate α-hemihydrate, filtering at least a portion of the calcium sulfate α-hemihydrate, and washing the filtered calcium sulfate α-hemihydrate, for example with acetone or ethanol.

Further aspects and advantages of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to the specific embodiments described herein.

DETAILED DESCRIPTION OF THE INVENTION

Figure 1:
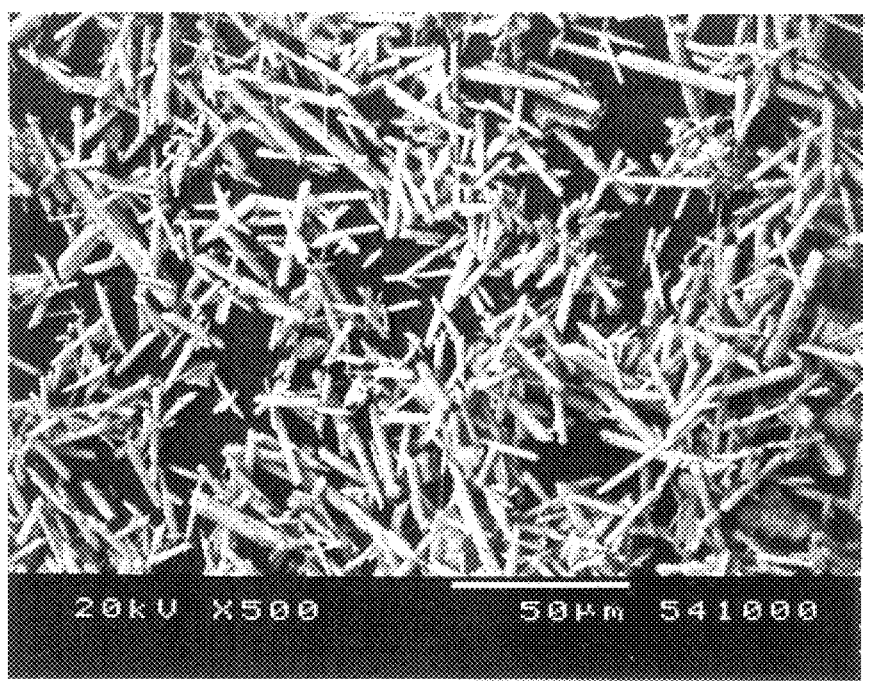
FIG. 1 is a scanning electron micrograph (SEM), at 500 times magnification, of crystals of a solid produced according to the invention.

The invention is directed to a method of producing calcium sulfate α-hemihydrate using microwave radiation. One aspect of the invention is a method of producing calcium sulfate α-hemihydrate including the steps of exposing a mixture including a calcium sulfate form selected from the group consisting of calcium sulfate dihydrate, calcium sulfate β-hemihydrate, soluble calcium sulfate anhydrite, and mixtures thereof, water, and a crystallization catalyst, to microwave radiation to produce calcium sulfate α-hemihydrate, and separating at least a portion of the calcium sulfate α-hemihydrate to provide a solid including calcium sulfate α-hemihydrate, and a remainder. Optionally, a mixture including the crystallization catalyst and water can be preheated, and can be combined with the calcium sulfate form to form a mixture. Additional optional ingredients can also be used in the method of the invention, such as crystal habit modifiers and surfactants.

Crystallization catalysts include water-soluble inorganic salts, such as aluminum sulfate, ammonium chloride, ammonium nitrate, calcium chloride, calcium nitrate, magnesium chloride, magnesium nitrate, magnesium sulfate, sodium chloride, sodium nitrate, potassium chloride, and zinc chloride. Other known crystallization catalysts include amide-derivatives of higher fatty acids, sulfate esters or higher alcohols; surface active agents having a sulfonic acid group as the hydrophilic atomic group; water-soluble proteins such as keratin, casein, glues, and the like; and salts of lower aliphatic polycarboxylic acids, such as succinic acid, citric acid, and the like. Preferred crystallization catalysts include water-soluble inorganic salts, most preferably calcium chloride. The use of sodium chloride preferably is avoided if the α-hemihydrate will be used in applications requiring high strength gypsum.

A crystallization catalyst preferably is used in concentration of at least about 2 molar. Below a concentration of about 2 molar, the catalyst becomes less effective on the rate of production of α-hemihydrate. The range of catalyst concentration in the method of the invention does not have an upper limitation, but for practical purposes the solubility limit of a salt in the aqueous mixture is a preferred maximum concentration, above which there are no benefits for the additional amount of catalyst added. When using calcium chloride as a crystallization catalyst, the preferred concentration is about 2.5 molar to about 3.5 molar, most preferably about 3 molar.

Preferably, the crystallization catalyst is combined with the water prior to addition of the calcium sulfate form. However, other orders of addition are possible, such as adding the crystallization catalyst last, or adding a crystallization catalyst, water, and calcium sulfate form together at once.

The raw material can be forms of calcium sulfate such as calcium sulfate dihydrate, calcium sulfate β-hemihydrate, and soluble calcium sulfate anhydrite. Both the calcium sulfate β-hemihydrate and anhydrite forms will first undergo hydration to calcium sulfate dihydrate before conversion to α-hemihydrate. Thus, calcium sulfate dihydrate is a preferred starting material for faster production of α-hemihydrate, and is also the most common form of calcium sulfate available from sources such as land plaster and in flue gas desulfurized gypsum.

There is no minimum concentration of the calcium sulfate form in the method of the invention but, for practical purposes, a minimum concentration of about 1% by weight, based on the weight of the water, will begin to produce sufficient calcium sulfate α-hemihydrate to justify the energy input costs. Above about 50% by weight, a slurry of water, crystallization catalyst, and the calcium sulfate form can begin to thicken to the extent that the access of the crystallization catalyst and/or crystal habit modifier (if used) to the calcium sulfate form is restricted, and the required time for full conversion to α-hemihydrate is extended. In addition, above about 50% calcium sulfate form by weight, the crystal morphology of the α-hemihydrate can be affected.

Preferably, a concentration of calcium sulfate form in the range of about 5% by weight to about 30% by weight, more preferably about 10% by weight to about 20% by weight, based on the weight of the water, is used in the method of the invention.

The calcium sulfate form preferably is added to a hot solution of water, crystallization accelerator and optional additional ingredients such as a crystal habit modifier. Other options are possible, such as adding all ingredients at once, or adding water, crystallization accelerator, and optional ingredients to the calcium sulfate form.

Various optional ingredients can be added to the basic ingredients to achieve objectives such as improved crystal morphology and improved conversion time. Preferred optional ingredients include crystal habit modifiers and surfactants.

Crystal habit modifiers include organic acids, such as lower (i.e., one to four carbons) monocarboxylic acids, formic, acetic, propionic, butyric; adipic, ascorbic, benzoic, citric, fumaric, gluconic, isophthalic, maleic, malic, malonic, mandelic, mellitic, oxalic, palmitic, phthalic, pyruvic, salicylic, succinic, sulfanylic, and tartaric acids, salts thereof (such as calcium, sodium, magnesium, and zinc salts), and esters thereof. Crystal habit modifiers are disclosed in U.S. Pat. Nos. 2,907,668 and 2,616,789, which are incorporated herein by reference.

A crystal habit modifier preferably is used in concentration of about 0.001% by weight to about 1% by weight, more preferably about 0.01% by weight to about 0.5% by weight, for example 0.2% by weight, based on the total weight of the mixture.

Surfactants for use in the invention include any ionic, anionic, or nonionic surfactant in an amount of about 0.001 wt. % to about 2 wt. %, preferably about 0.01 wt. % to about 0.5 wt. %, for example about 0.1 wt. %, based on the total weight of the mixture. Anionic surfactants are preferred. Sulfates and sulfonates, such as alkyl aryl sulfonates, are also preferred.

The microwave radiation used in a method according to the invention should be of a frequency and power (e.g., measured in watts) sufficient to heat the mixture to a temperature of at least about 90° C., preferably up to about 160° C., as rapidly as possible, and to maintain the temperature of the mixture in the range of about 90° C. to about 160° C. for a time sufficient to achieve substantially complete conversion (at least about 90% by weight), preferably complete conversion of the calcium sulfate form to calcium sulfate α-hemihydrate. The power input to the reaction mixture can be controlled via increasing or decreasing the power of the microwave generator to maintain the desired temperature, or by using a set power level and cycling the transmission of radiation on and off to maintain the desired temperature. The amount of power required to heat the reaction mixture will depend in part on the amount of mixture being treated to maintain the desired temperature. Thus, a 650 watt source was used in the examples described below, and provided more than enough power to heat the samples, but a higher power source would be required for a commercial-scale operation.

The U.S. Federal Communications Commission (FCC) considers the lower end of the microwave region to start at a frequency of 890 million cycles per second, or 890 megahertz (MHz); the Institute of Electrical and Electronics Engineers (IEEE) considers the microwave region to begin at approximately 1,000 MHz. Others consider microwaves as the frequency band extending from 300 MHz to 300 billion cycles per second, or 300 gigahertz (GHz). The term "microwave radiation" in the method of the invention is defined as radiation in a range of about 300 MHz to about 300 GHz.

A microwave radiation frequency of about 2.45 GHz is preferred, in part because that is one of the frequencies allocated for use by the U.S. Government for applications such as microwave ovens. Radiation at 2.45 GHz frequency is absorbed weakly enough in liquid water that the waves maintain good strength even deep inside a typical water-containing mass, such as a food product or, in this case, a slurry or mixture containing one or more calcium sulfate forms. Higher frequencies penetrate less well and heat less evenly, as a result of more of the energy being absorbed at the outer water-containing layers. Lower frequencies penetrate better, but are absorbed so weakly by water that they tend to heat poorly. The 2.45 GHz frequency is thus a compromise between penetration depth and efficiency of absorption.

Without intending to be bound by any theory, it is believed that the microwave energy affects molecules in the mixture in two ways. The first effect is on dipole rotation. When microwave energy passes through a sample, the molecules of the sample having dipole moments (such as water) will try to align themselves with it. The more polar the compound, the stronger is the interaction with the electric field. The amount of energy transferred, the loss tangent, is a non-linear function of both the dipole moment of the molecule and the dielectric constant. The energy transfer is more efficient when the molecules are able to relax quickly; and the most efficient transfer occurs when the relaxation time matches the frequency of the microwave energy. As small molecules (such as water) absorb microwave energy, they move farther away from the resonance frequency and absorb less energy as they heat.

The second effect is ionic conduction. In the presence of an electric field, ionic species will migrate in one direction or the other depending on the electric field. During this migration, energy is transferred from the electric field causing ionic interactions that speed up the heating of a solution. Ionic conduction increases with temperature, allowing ionic solutions to become stronger absorbers of microwave energy as they are heated.

It is believed that it is this combined effect of microwave energy on molecules of the mixture having dipole moments (such as water) and ionic species in the mixture (such as calcium chloride, $Ca^+ + 2Cl^-$) that accounts for the efficient, rapid heating and rapid conversion of calcium sulfate forms to calcium sulfate α-hemihydrate achieved by a method according to the invention. In addition to the rapid, efficient heating achieved by microwave heating, it has also been found that the method of producing α-hemihydrate according to the invention eliminates the need for stirring the mixture during heating, which is necessary when using conventional heat to achieve uniform conversion to α-hemihydrate throughout the sample.

In a preferred method of the invention, substantially complete (at least about 90% by weight) conversion of the calcium sulfate forms to calcium sulfate α-hemihydrate is achieved in about 20 minutes or less, more preferably about 15 minutes or less, most preferably about 10 minutes or less. In another preferred method of the invention, complete (at least about 99% by weight) conversion of the calcium sulfate forms to calcium sulfate α-hemihydrate is achieved in about 20 minutes or less, more preferably about 15 minutes or less, most preferably about 10 minutes or less.

In preferred embodiments of a method according to the invention, the device supporting or containing the mixture during exposure to microwave radiation does not significantly absorb radiation of the frequency applied to the reaction mixture. Thus, when the method of the invention is carried out as a batch or a continuous process, an open or closed container, vessel, support, conduit, belt conveyor, or the like, can be made of a material such as a ceramic, glass, quartz, TEFLON polymer, or combinations thereof. The use of these specific materials is also preferred for resistance to chemical attack from acid species. Elsewhere throughout a process according to the invention, equipment that is wetted by an acid-containing mixture according to certain preferred embodiments of the invention is preferably constructed or treated to provide resistance to corrosion.

In a method according to the invention, the reaction mixture is exposed to microwave radiation to produce calcium sulfate α-hemihydrate, preferably for a time sufficient to result in substantially complete conversion of calcium sulfate forms to α-hemihydrate. The method of the invention results in very fast, substantially complete conversion to α-hemihydrate, in as little as 10 minutes with the particular calcium sulfate source, crystallization catalyst, microwave frequency, and power tested. Preferably, the mixture is exposed for a time in a range of about 10 minutes to about 20 minutes. Depending on the particular mixture and frequency, and power used, the time until full conversion can vary. Using parameters similar to those in the examples below, exposure for a time substantially in excess of about 20 minutes can result in evaporation of sufficient water such that calcium sulfate anhydrite can begin to form.

In a method according to the invention the mixture is heated to a temperature in a range of about 80° C. to about 160° C., preferably about 90° C. to about 130° C., more preferably about 100° C. to about 120° C., depending on factors such as the relative ratios of the components and the composition of the raw material used (e.g., relative amounts of calcium sulfate dihydrate and impurities). The heating is performed at least in part by the exposure to microwave radiation, most preferably substantially entirely by the exposure to microwave radiation.

The separation of a solid containing calcium sulfate α-hemihydrate from the reaction mixture preferably is performed by filtration, for example by centrifugal filtration, belt filtration, or a type of vacuum filtration. Where the solid includes additional feed impurities that are not detrimental to the end use of the α-hemihydrate, the solid can be washed and dried as described below. For example, α-hemihydrate containing small amounts of clay is still useful for gypsum wallboard production. In other cases, the α-hemihydrate can be isolated from impurities at this stage in the process.

In an improvement upon the basic process, the filtrate and/or any other remainder can be recycled to provide at least one of a calcium sulfate form, water, a crystallization catalyst, a crystal habit modifier, and a surfactant for use in production of additional α-hemihydrate. In a process including a recycling expedient, preferably at least one recycled component is heated, for example to substantially maintain its temperature near the reaction mixture temperature, so that subsequent cycles of α-hemihydrate production proceed rapidly (i.e., without substantial delay incurred by the need to heat the recycled component). Heating of the recycled component can be by conventional heat or with the use of microwave radiation.

The separated calcium sulfate α-hemihydrate-containing solid preferably is washed to remove residual crystallization catalyst and optional additives from the reaction mixture. Preferably, the separated solid is washed soon after filtration, both to prevent rehydration of the hemihydrate and to prevent further dehydration or efflorescence. Hot water can be used to wash the α-hemihydrate product, preferably at a temperature of about 40° C. to 80° C. When hot water is used as the washing liquid, the α-hemihydrate is preferably dried of surface water at a temperature of about 40° C. to about 130° C., more preferably about 40° C. to about 110° C. Surface drying can be performed in a conventional-type oven, or via exposure to microwave radiation, preferably under reduced pressure (e.g., in a vacuum drying oven).

In another method according to the invention, the α-hemihydrate can be dried of surface water with an organic or inorganic solvent, such as ethanol, isopropanol, and acetone. When an organic or inorganic solvent such as ethanol, isopropanol, or acetone is used, the step of washing with hot water can be completely omitted, and the drying solvent can be used as a dual-purpose washing liquid.

In a preferred method according to the invention, a mixture of water and crystallization catalyst (with optional additives, if used) is preheated before forming a mixture with a calcium sulfate form. The mixture of water and crystallization catalyst preferably is preheated to the same temperature desired for producing α-hemihydrate, and the mixture can also be preheated to a slightly higher temperature to compensate for the enthalpy loss upon addition of a calcium sulfate form. For example, the mixture of water and crystallization catalyst can be preheated to about 90° C. to about 140° C. By preheating the mixture of water and crystallization catalyst, the production of α-hemihydrate upon addition of a calcium sulfate form is accelerated. Preferably, the mixture and water is heated by exposure to microwave radiation.

EXAMPLES

The following examples are provided to illustrate the invention but are not intended to limit the scope of the invention.

Example 1

About 10 milliliters (ml) of 3 molar aqueous calcium chloride (J. T. Baker Inc., Phillipsburg, N.J.) solution was placed in a porcelain crucible and heated to about 110° C. by exposure to microwave radiation in a CEM microwave system model MDS-81D microwave oven system (CEM Corporation, Matthews, N.C.) for about 10 minutes. To the hot solution about 2 grams of land plaster containing about 7% by weight impurities, including clay and strontium sulfate, was added and the combination was briefly mixed by hand with a glass rod to form a slurry. The land plaster used was first ground to a size in the range of about 10 $\mu$m to about 200 $\mu$m, with the majority of the particles in the range of about 60 $\mu$m to about 90 $\mu$m. The slurry thus formed was exposed to microwave radiation. The microwave oven was operated at full power, and the power was cycled on and off to maintain the temperature of the mixture at about 110° C. The mixture was not stirred during heating. At 20 minutes after the land plaster was added, the slurry was filtered by vacuum filtration using a glass microfiber filter in a porcelain crucible, and the recovered solid was rinsed with isopropanol. The recovered solid was then dried in a vacuum oven at 109° F. (about 43° C.).

Figure 2:
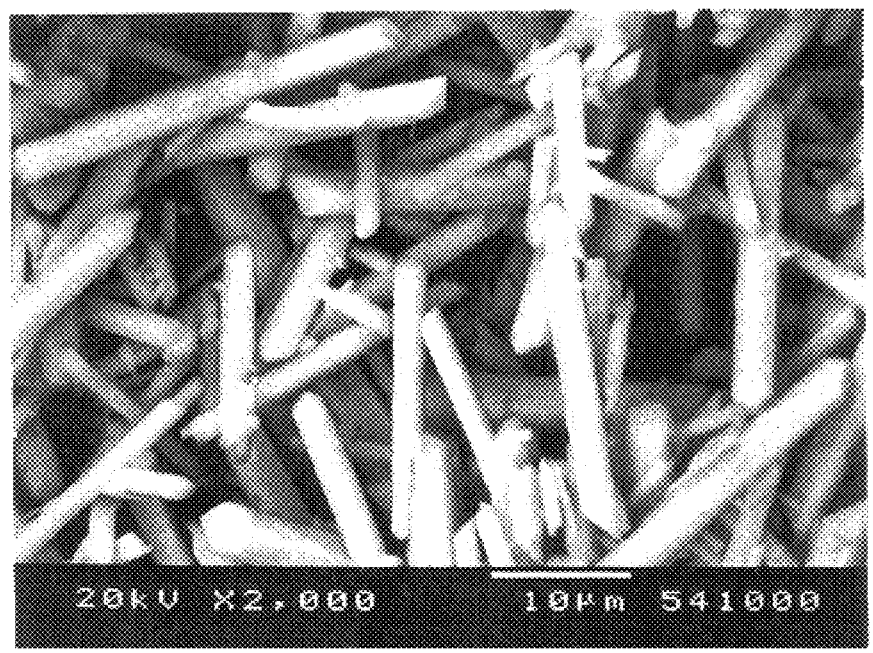
FIG. 2 is a SEM, at 2,000 times magnification, of crystals of a solid produced according to the invention.

FIG. 1 is a scanning electron micrograph (SEM) of the crystals of the recovered solid at 500 times magnification. FIG. 2 is an SEM of the crystals of the recovered solid at 2,000 times magnification. The SEMs show thin and relatively long, needle-shaped crystals, which are typical of α-hemihydrate.

Figure 3:
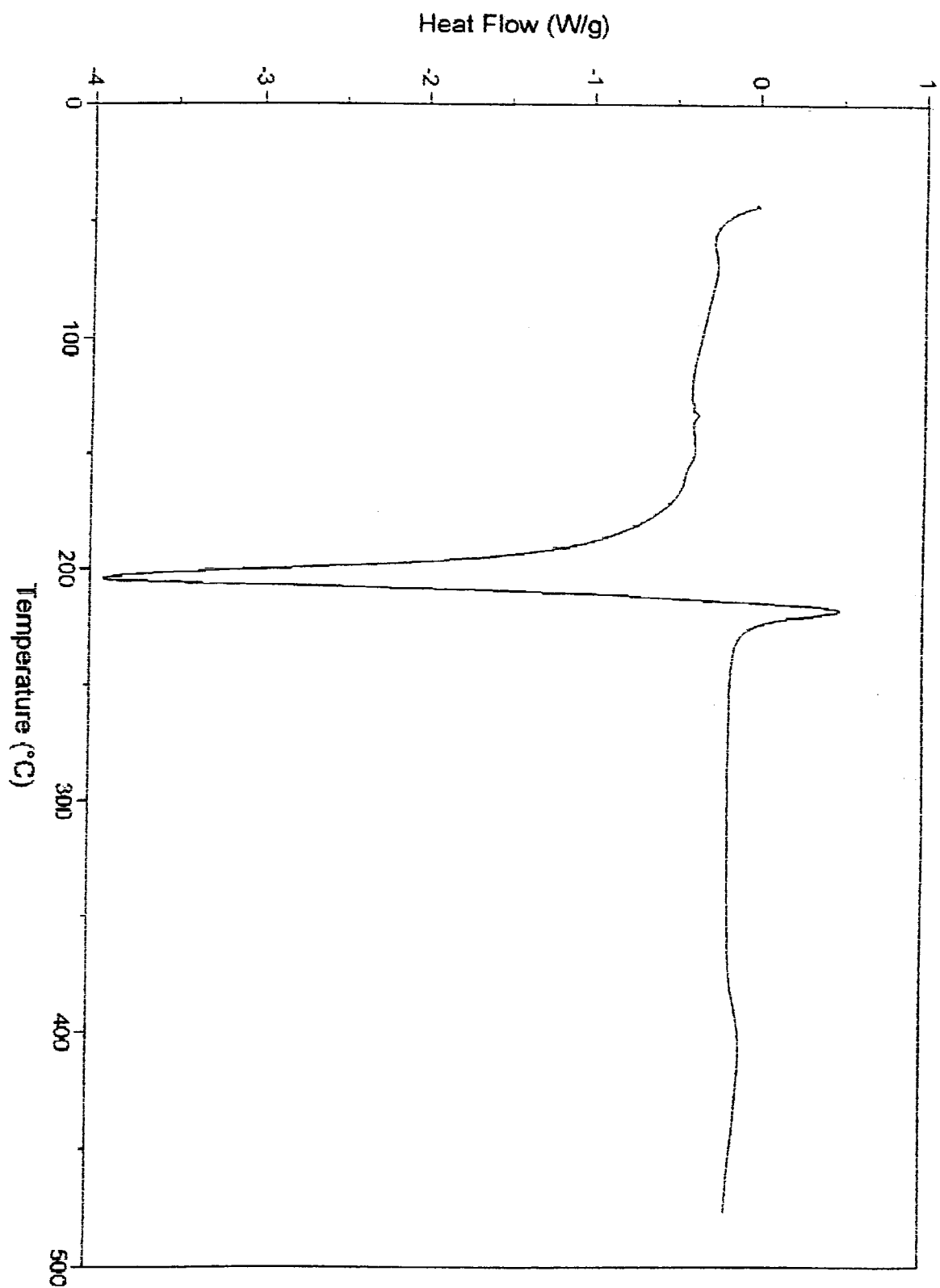
FIG. 3 is a differential scanning calorimetry (DSC) plot of heat flow (watts/gram) versus temperature (° C.) for a sample of α-hemihydrate-containing solid produced according to the invention by exposure of land plaster to microwave radiation for 20 minutes at 110° C.

FIG. 3 is a differential scanning calorimetry (DSC) plot of heat flow (watts/gram) versus temperature (° C.) for a 9.9 milligram (mg) sample of the recovered solid, at a scan rate of 10° C./minute. The DSC plot shows an exothermic peak (about 220° C.) indicative of α-hemihydrate. An estimate of the degree of conversion was made by visual observation of the crystals by SEM and by evaluation of the DSC plot, and is approximated to be at least 90% to 95% conversion to α-hemihydrate.

Figure 4:
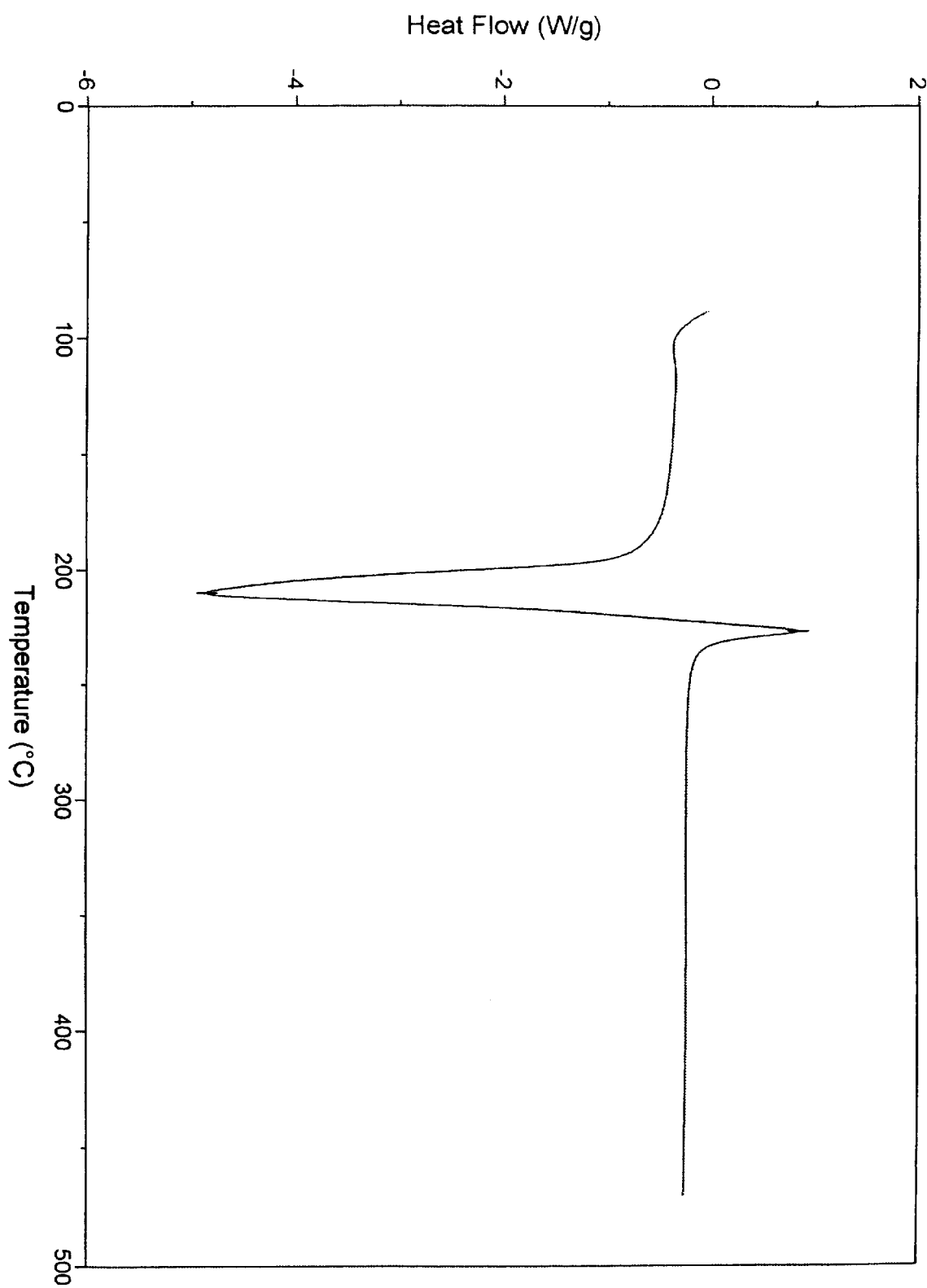
FIG. 4 is a DSC plot of heat flow (watts/gram) versus temperature (° C.) for a sample of commercially-available α-hemihydrate.

FIG. 4 is a DSC plot, obtained by the same measurement technique, of a 10 mg sample of commercially purchased α-hemihydrate, from British Plaster Board Company of Pittsburgh, Pa. The DSC plot shows an exothermic peak (about 225° C.) indicative of α-hemihydrate. The purity of the sample is substantially free of calcium sulfate dihydrate (i.e., estimated to be less than about 3% of other forms of calcium sulfate).

Example 2

Figure 5:
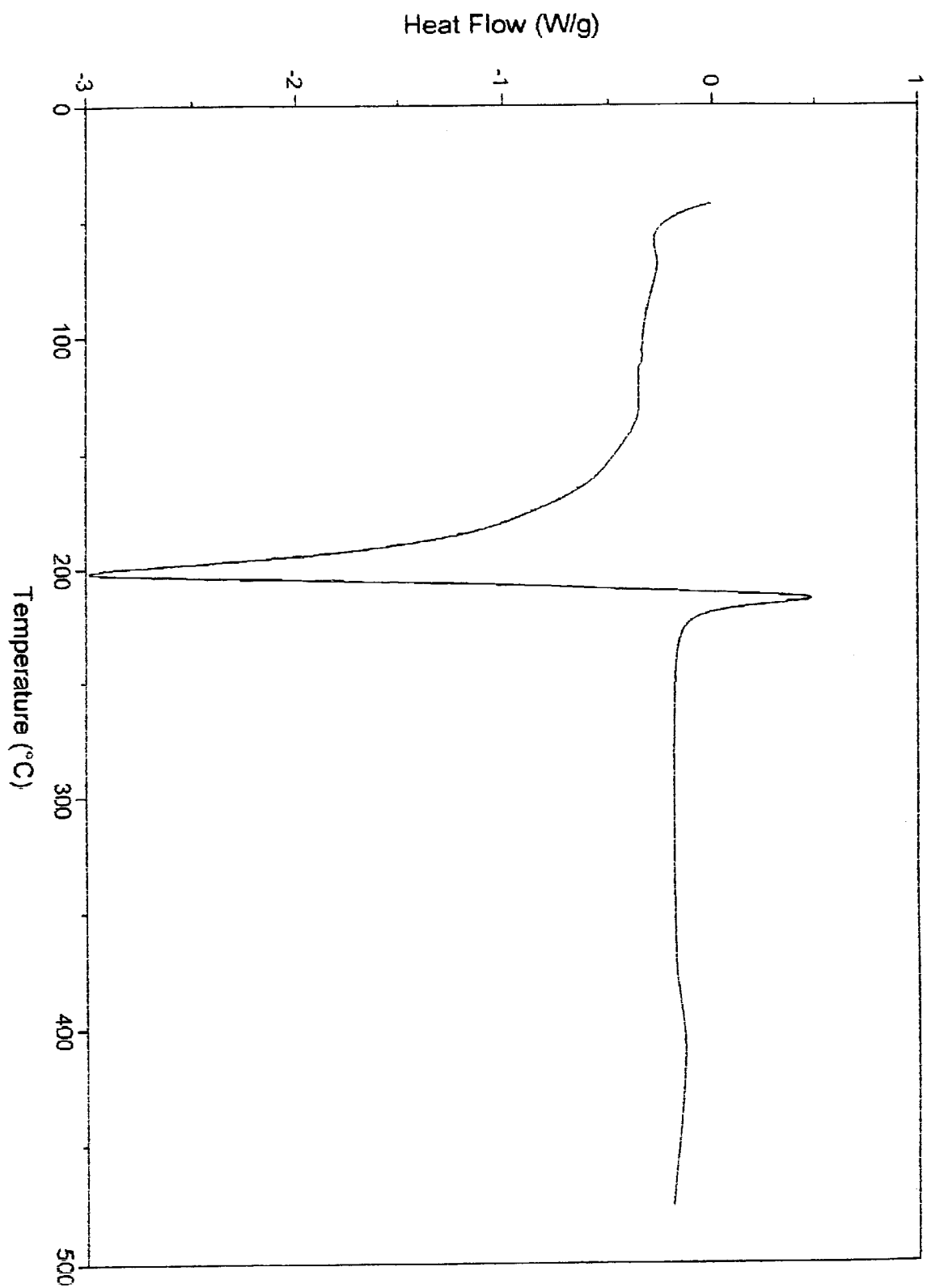
FIG. 5 is a DSC plot of heat flow (watts/gram) versus temperature (° C.) for a sample of α-hemihydrate-containing solid produced according to the invention by exposure of land plaster to microwave radiation for 15 minutes at 110° C.

The procedure of Example 1 was repeated, with the difference that the exposure time of the mixture to microwave radiation was reduced to 15 minutes. FIG. 5 is a DSC plot of a 12.2 mg sample, obtained by the same measurement technique of Example 1, that shows an exothermic peak (about 220° C.) indicative of α-hemihydrate. The degree of conversion is estimated to be at least 90% to 95% conversion to α-hemihydrate.

Example 3

Figure 6:
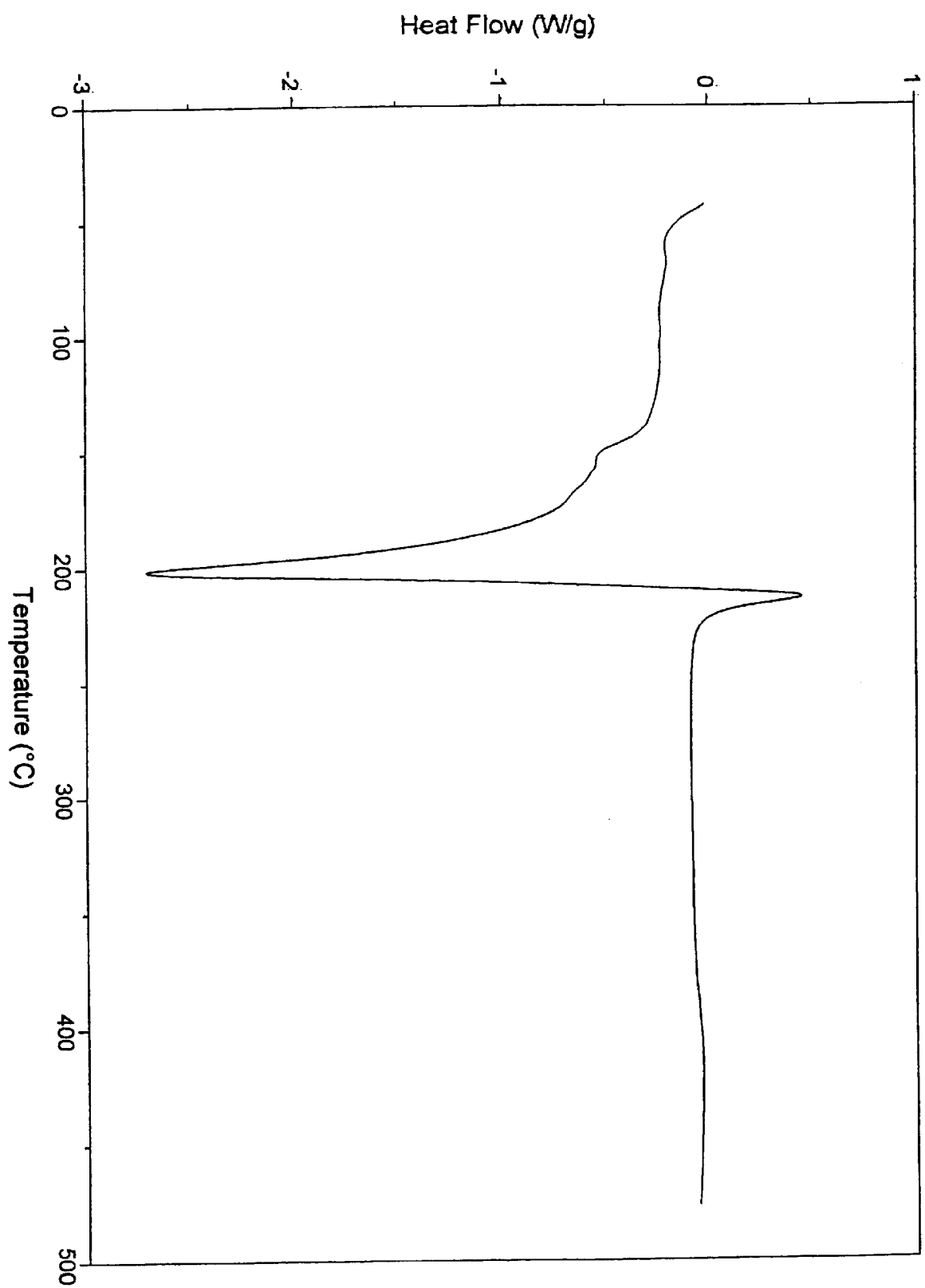
FIG. 6 is a DSC plot of heat flow (watts/gram) versus temperature (° C.) for a sample of α-hemihydrate-containing solid produced according to the invention by exposure of land plaster to microwave radiation for 10 minutes at 110° C.

The procedure of Example 1 was repeated, with the difference that the exposure time of the mixture to microwave radiation was reduced to 10 minutes. FIG. 6 is a DSC plot of a 10.3 mg sample, obtained by the same measurement technique of Example 1, that shows an exothermic peak (about 220° C.) indicative of α-hemihydrate. The DSC plot also shows a small endothermic peak (about 145° C.) indicative of the presence of calcium sulfate dihydrate. Although quantitative estimation based on the DSC plot alone is difficult, in conjunction with past experience the degree of conversion is estimated to be in excess of approximately 80% conversion to α-hemihydrate.

Example 4

Figure 7:
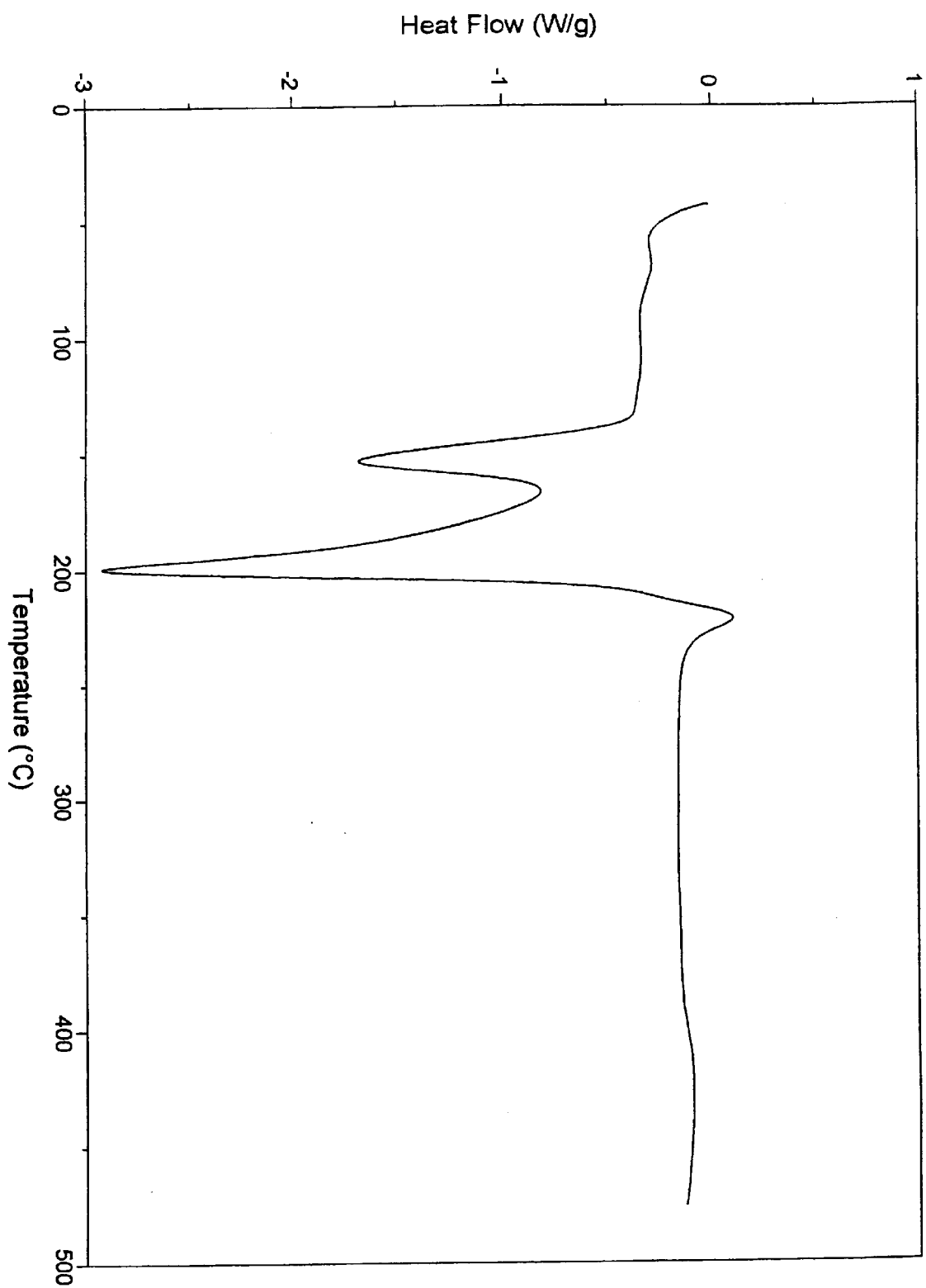
FIG. 7 is a DSC plot of heat flow (watts/gram) versus temperature (° C.) for a sample of α-hemihydrate-containing solid produced according to the invention by exposure of land plaster to microwave radiation for 10 minutes at 110° C. in the presence of tartaric acid.

The procedure of Example 1 was repeated, with the differences that the solution was preheated at 110° C. for only five minutes, one gram of land plaster was added, 0.02 grams of tartaric acid was added, and the exposure time of the mixture to microwave radiation was reduced to 10 minutes. FIG. 7 is a DSC plot of a 8.9 mg sample, obtained by the same measurement technique of Example 1, that shows an exothermic peak (about 220° C.) indicative of α-hemihydrate. The DSC plot also shows an endothermic peak (about 150° C.) indicative of the presence of calcium sulfate dihydrate, and incomplete conversion to α-hemihydrate. Although quantitative estimation based on the DSC plot alone is difficult, in conjunction with past experience the degree of conversion is estimated to be in excess of approximately 50% to 60% conversion to α-hemihydrate.

Example 5

Figure 8:
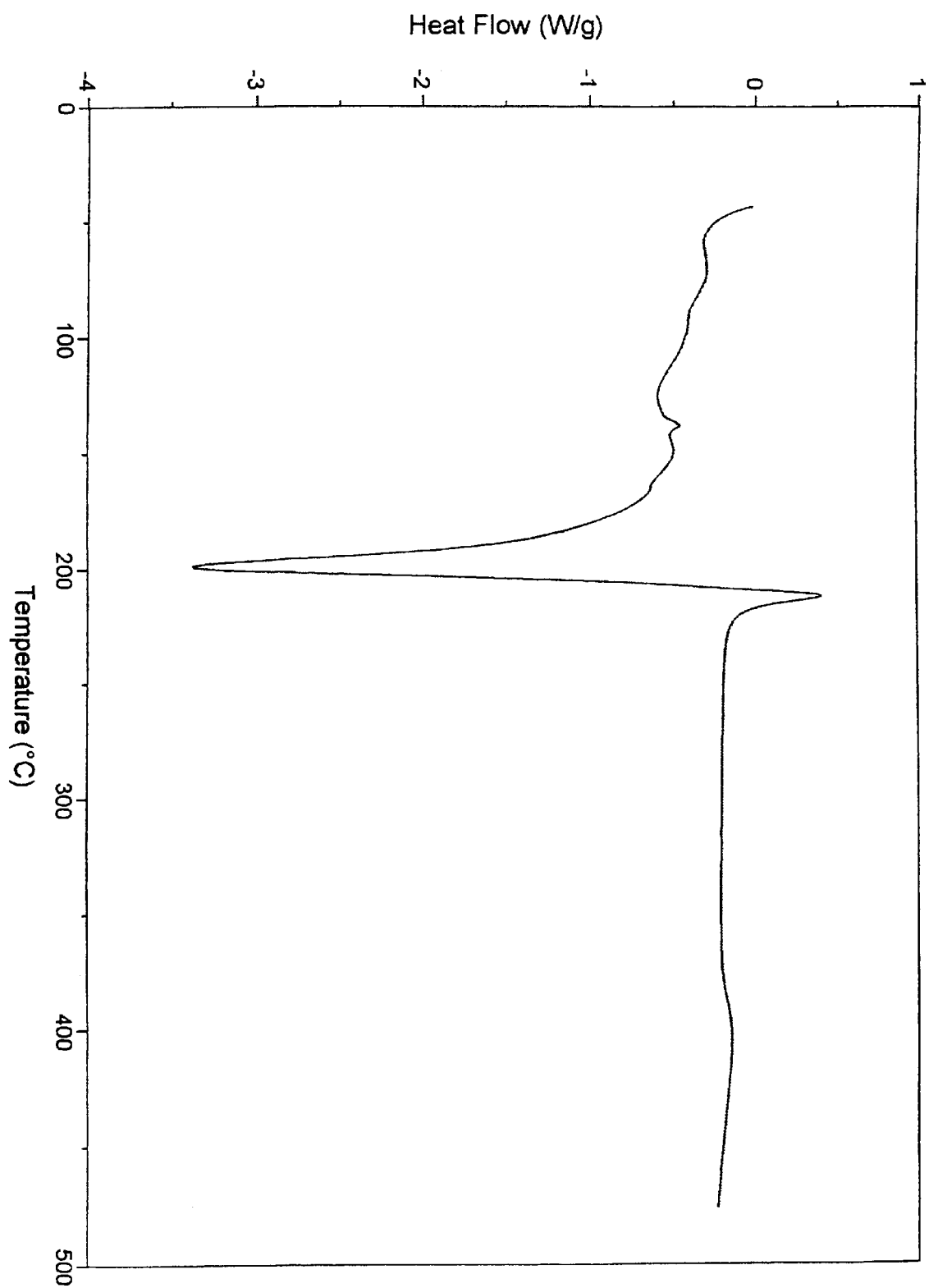
FIG. 8 is a DSC plot of heat flow (watts/gram) versus temperature (° C.) for a sample of α-hemihydrate-containing solid produced according to the invention by exposure of land plaster to microwave radiation for 15 minutes at 120° C.

The procedure of Example 1 was repeated, with the differences that the calcium chloride solution was heated to 140° C. for about 3 minutes, and the mixture was exposed to microwave radiation for about 15 minutes at about 120° C. FIG. 8 is a DSC plot of a 7.0 mg sample, obtained by the same measurement technique of Example 1, that shows an exothermic peak (about 220° C.) indicative of α-hemihydrate. The degree of conversion is estimated to be at least 90% to 95% conversion to α-hemihydrate.

Example 6

Figure 9:
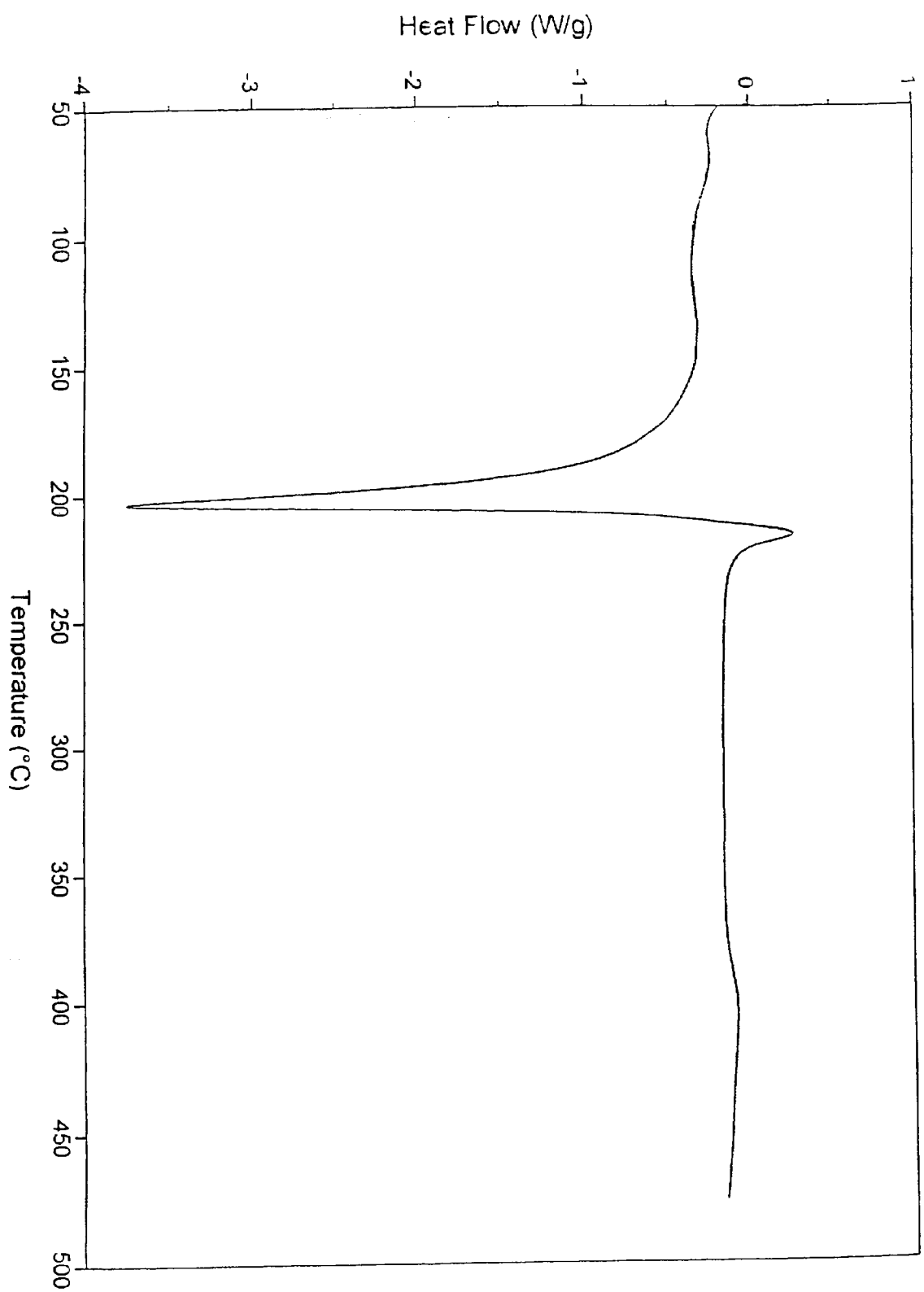
FIG. 9 is a DSC plot of heat flow (watts/gram) versus temperature (° C.) for a sample of α-hemihydrate-containing solid produced according to the invention by exposure of screened land plaster to microwave radiation for 20 minutes at 120° C.

The procedure of Example 5 was repeated, with the differences that the land plaster used was first screened to a particle size greater than 38 microns and less than 80 microns and the mixture was exposed to microwave radiation for about 20 minutes. FIG. 9 is a DSC plot of a 8.7 mg sample, obtained by the same measurement technique of Example 1, that shows an exothermic peak (about 220° C.) indicative of α-hemihydrate. The degree of conversion is estimated to be at least 90% to 95% conversion to α-hemihydrate.

Using a method according to the invention, calcium sulfate α-hemihydrate can be rapidly and efficiently produced from forms of calcium sulfate such as calcium sulfate dihydrate and calcium sulfate β-hemihydrate, without formation of substantial calcium sulfate anhydrite and without the need to stir the mixture during heating and conversion. In addition, the efficiencies of microwave heating can be realized in an all-microwave system by also drying the calcium sulfate α-hemihydrate-containing solid with microwave energy.

The foregoing description is given for clearness of understanding only, and no unnecessary limitations should be understood therefrom, as modifications within the scope of the invention may be apparent to those having ordinary skill in the art.

What is claimed is:

1. A method of producing calcium sulfate α-hemihydrate, comprising the steps of:
   (a) exposing a mixture comprising a calcium sulfate form selected from the group consisting of calcium sulfate dihydrate, calcium sulfate ⊖-hemihydrate, water-soluble calcium sulfate anhydrite, and mixtures thereof, water, and a crystallization catalyst, to microwave radiation in the range of about 300 MHz to about 300 GHz to produce calcium sulfate α-hemihydrate; and
   (b) separating at least a portion of said calcium sulfate α-hemihydrate from the product of step (a) to provide a solid comprising calcium sulfate α-hemihydrate and a remainder.

2. The method of claim 1, wherein said crystallization catalyst is a water-soluble inorganic salt.

3. The method of claim 2, wherein said water-soluble inorganic salt is selected from the group consisting of aluminum sulfate, calcium chloride, magnesium sulfate, magnesium chloride, magnesium nitrate, sodium chloride, and mixtures thereof.

4. The method of claim 3, wherein said water-soluble inorganic salt is calcium chloride.

5. The method of claim 1, wherein said crystallization catalyst is present in a concentration of at least about 2 molar.

6. The method of claim 1, wherein said crystallization catalyst is present in a concentration of about 2.5 molar to about 3.5 molar.

7. The method of claim 1, wherein said calcium sulfate form is present at about 1% to about 50% of the mixture by weight.

8. The method of claim 1, wherein said mixture further comprises a crystal habit modifier.

9. The method of claim 8, wherein said crystal habit modifier is selected from the group consisting of an organic acid, and ester thereof, salt thereof, and mixtures thereof.

10. The method of claim 8, wherein said crystal habit modifier is present in a concentration of about 0.001% by weight to about 1% by weight of the mixture.

11. The method of claim 1, wherein said mixture further comprises a surfactant.

12. The method of claim 11, wherein said surfactant is an anionic surfactant.

13. The method of claim 11, wherein said surfactant is present in a concentration of about 0.001 wt. % to about 2 wt. %, based on the weight of the mixture.

14. The method of claim 1, comprising the step of heating said mixture to temperature in a range of about 90° C. to about 130° C.

15. The method of claim 14, comprising the step of heating said mixture to temperature in a range of about 100° C. to about 120° C.

16. The method of claim 14, wherein said heating step is at least in part performed by said exposing step.

17. The method of claim 1, comprising the step of exposing said mixture to microwave radiation for a time in a range of about 10 minutes to about 20 minutes.

18. The method of claim 1, wherein said separating step comprises filtering.

19. The method of claim 1, comprising the step of recycling at least a portion of said remainder to provide at least one of a calcium sulfate form, water, and a crystallization catalyst.

20. The method of claim 18, comprising the step of heating said recycled portion.

21. The method of claim 20 wherein said washing is performed with acetone or ethanol.

22. The method of claim 1, comprising the step of washing said calcium sulfate α-hemihydrate.

23. The method of claim 1 further comprising drying the solid comprising calcium sulfate α-hemihydrate by exposure to microwave radiation.

24. The method of claim 1, comprising the step of:
   preheating a mixture of water and a crystallization catalyst; and
   combining said water and said crystallization catalyst with a calcium sulfate form selected from the group consisting of calcium sulfate dihydrate, calcium sulfate β-hemihydrate, soluble calcium sulfate anhydrite and mixtures thereof, to form said mixture of claim 1.

25. The method of claim 24 wherein said preheating is by exposure to microwave radiation.

26. The method of claim 24 wherein said preheating raises the temperature of said mixture of water and a crystallization catalyst to a temperature in a range of about 90° C. to about 140° C.

27. A method of producing calcium sulfate α-hemihydrate, comprising the steps of:
   forming a mixture comprising calcium sulfate dehydrate, water, and calcium chloride, wherein said calcium chloride is present at a concentration of about 2.5 molar to about 3.5 molar;
   exposing said mixture to microwave radiation in the range of about 300 MHz to about 300 GHz to produce calcium sulfate α-hemihydrate;
   filtering at least a portion of said calcium sulfate α-hemihydrate; and
   washing said filtered calcium sulfate α-hemihydrate with acetone or ethanol.

28. The method of claim 27, comprising the steps of:
   preheating a mixture of water and a calcium chloride; and
   combining said water and said calcium chloride with calcium sulfate dihydrate to form said mixture of claim 27.

* * * * *

UNITED STATES PATENT AND TRADEMARK OFFICE
CERTIFICATE OF CORRECTION

PATENT NO.   : 6,652,825 B2
DATED        : January 20, 2004
INVENTOR(S)  : Sethuraman et al.

It is certified that error appears in the above-identified patent and that said Letters Patent is hereby corrected as shown below:

Column 11,
Line 34, change "θ" to -- β --.
Line 64, change "and ester thereof, salt thereof" to -- an ester thereof, a salt thereof --.

Column 12,
Lines 26-29, please replace the claims with the following two claims:
-- 21. The method of claim 1, comprising the step of washing said calcium sulfate α-hemihydrate.
  22. The method of claim 21, wherein said washing is performed with acetone or ethanol. --

Signed and Sealed this

Ninth Day of November, 2004

JON W. DUDAS
*Director of the United States Patent and Trademark Office*